United States Patent [19]

Harrison et al.

[11] 4,324,319

[45] Apr. 13, 1982

[54] VEHICLE BRAKES WITH AUTOMATIC SLACK ADJUSTERS

[75] Inventors: Anthony W. Harrison, Birmingham; Peter W. Brown, West Midlands, both of England

[73] Assignee: Lucas Industries Limited, Birmingham, England

[21] Appl. No.: 85,396

[22] Filed: Oct. 16, 1979

[30] Foreign Application Priority Data

Oct. 21, 1978 [GB] United Kingdom ............... 41474/78
Jan. 25, 1979 [GB] United Kingdom ............... 02616/79

[51] Int. Cl.³ .............................................. F16D 65/60
[52] U.S. Cl. ............................ 188/79.5 K; 188/196 A
[58] Field of Search ................... 188/79.5 GE, 79.5 K, 188/79.5 P, 196 A, 196 BA

[56] References Cited

U.S. PATENT DOCUMENTS

| | | | |
|---|---|---|---|
| 2,551,888 | 5/1951 | Learn | 188/196 A X |
| 2,554,065 | 5/1951 | Shields | 188/79.5 K |
| 2,649,170 | 8/1953 | Shumaker | 188/196 A |

Primary Examiner—Duane A. Reger
Attorney, Agent, or Firm—Scrivener, Clarke, Scrivener and Johnson

[57] ABSTRACT

In brakes in which a friction member is urged into engagement with a rotatable braking member by a fluid-pressure operated actuator, for example internal shoe-drum brakes, the actuator and an adjuster for adjusting brake clearances are located between different pairs of shoe-ends.

If the adjuster is automatic, it is difficult to transfer signals at the actuator that adjustment is required to the adjuster with sufficient energy to operate it, without affecting the operation of the actuator. Thus the adjuster is operated by a supply of pressure fluid controlled by a valve assembly which is operative to supply fluid to the adjuster when relative movement between parts of the actuator exceeds a predetermined value. The adjuster is operated by a slave unit.

The valve assembly may comprise a valve operated by rotation of a shaft for applying the brake, or two valves embodied in the actuator itself.

20 Claims, 9 Drawing Figures

VEHICLE BRAKES WITH AUTOMATIC SLACK ADJUSTERS

This invention relates to improvements in brakes for vehicles of the kind in which a friction member is adapted to be urged into engagement with a rotatable braking member by means of a fluid-pressure operated actuator.

In some known vehicle brakes of the internal shoe-drum type an actuator is located between one pair of adjacent shoe-ends, and a separate adjuster for adjusting the brake clearance between the shoe and the drum is located at the opposite end of the brake, between the other pair of adjacent shoe-ends. When the adjuster is of the automatically adjusting type for automatically maintaining predetermined brake clearances, it is desirable for signals that adjustment is required to be sensed at an actuator. It is difficult and awkward to transfer such signals from the actuator to the adjuster with sufficient energy for the adjuster to be operated. This problem is worse when an existing design of shoe-drum brake is to be adapted for automatic adjustment, so that there can be an option of manual or automatic adjustment.

Generally known automatic adjusters are operated by energy taken from a brake actuation system. This means that such an adjuster has to be designed and constructed so that the energy required to operate it is minimised, otherwise the loss of force from the actuator for applying the brake would be significant. This loss is important when the brake is applied with the vehicle travelling over a surface of low coefficient of friction. Since all the brakes will not be adjusting at the same time this could cause a poor distribution of the brake forces between the wheels of the vehicle. If unlimited energy was available to operate the adjusters, automatic adjusters could be designed to optimise other aspects of their performance. The most important benefit would be increased reliability when the mechanism deteriorates due to dirt and corrosion.

According to our invention in a brake of the kind set forth an automatic adjuster for automatically maintaining predetermined brake clearances is operated by a supply of fluid under pressure under the control of a valve assembly, and the valve assembly is operable to supply the fluid to the adjuster when relative movement between parts of the actuator exeeds a predetermined value.

This therefore provides a convenient sensing means and driving means for automatic adjusters, which is particularly of use when the adjuster is remote from a source of energy, namely the supply of fluid under pressure. Also the supply of fluid under pressure provides sufficient energy for operating the adjuster, without affecting the brake actuation force.

The supply of fluid under pressure may comprise a bleed of pressure fluid from the actuator itself, or the valve assembly, which may also be embodied in the actuator, may supply fluid to the adjuster from a source of fluid under pressure which is separate from the actuator.

Preferably the adjuster is operated by a slave unit which produces a motive force in response to pressure fluid from the supply.

In one construction the valve assembly comprises a first valve means, and a second valve means disposed between the first valve means and the slave unit so that all the pressure fluid to the slave unit has to pass through it and the second valve means is adapted to close in response to fluid pressure generated by relative movement between the parts of the actuator before the first valve means can open.

The provision of the second valve means makes the response of the adjuster "load insensitive" that is, the response is dependent on the travel of the actuator required to take up brake clearances, not on the total travel of the actuator, and the slave unit will not be operated unless the first valve means opens before the pressure is sufficient to close the second valve means. Thus when the first valve means is incorporated in the actuator and the signal pressure comprises a bleed taken from the actuator, the second valve means is closed when the actuator pressure which corresponds to the brake force rises above a chosen threshold level, and opens when it falls below that level.

In this construction both valve means are incorporated into the actuator housing, with the first valve means comprising a tube having ports and being adapted to slide through a seal in response to relative movement between parts of the actuator, and being arranged so that when the first valve means is open pressure fluid is supplied to the tube, and the second valve means being located between the housing and an end of the tube, and being adapted to close to cut off communication between the tube, and a pipe-line to the slave unit for the pressure fluid.

The second valve means may include a resilient rubber disc adapted to engage with a seating surrounding the pipe-line. This may, however, generate considerable sliding friction, so in an alternative construction the second valve means comprises a flexible diaphragm connected between the housing and the end of the tube, a valve member urged by the diaphragm into engagement with a seating surrounding the pipe-line, and a spring urging the valve member away from the seating.

In a further construction the valve assembly incorporates a single valve means, and the pressure in the slave unit falls when that in the actuator falls, at least over a predetermined pressure range, to cause the slave unit to be ready for a further adjustment sequence.

The action continues upon each sucessive brake operation of the actuator until the relative movement between the said parts of the actuator is reduced to a value less than that required to operate the valve means.

An adjuster operated in this way will be "load sensitive". That is to say the response will depend upon the total travel of the actuator, and not upon the travel only required to take up the brake clearances.

In the further construction the valve means is operable in response to rotation of a shaft for applying the brake.

This has the advantage that no modification to the housing or other parts of the mechanism of the actuator is necessary, and the valve means can be fitted to existing brakes of the kind set forth after modifying the shaft for applying the brake.

Conveniently, the shaft comprises a camshaft which carries a cam for separating the adjacent shoe-ends, and the camshaft is provided with an axially extending notch which receives a member for operating the valve means, the valve-operating member being held against rotation but permitted to move in a radial direction by guide means.

Conveniently the valve assembly comprises a housing having guide means in the form of a bore radial to the camshaft, and the valve means comprises a valve member located in the outer portion of the bore, and normally biassed to closure against a seating to cut off communication between the supply of pressure fluid and a pipeline to the slave unit, and the valve-operating member is guided in the inner portion of the bore, and is provided with an exhaust port for pressure fluid from the slave unit which is closed when the valve means is open, the valve-operating member at its inner end cooperating with the camshaft and at its outer end being adapted to operate the valve member.

The valve member may comprise a resilient member, or the valve member may comprise a snap-acting valve sleeve.

The valve-operating member may co-operate with the camshaft directly, or a thrust member may be interposed between the valve-operating member and the camshaft.

The slave unit is preferably of the reciprocating type embodying pistons and diaphragms, but it may be of a rotary or semi-rotary type.

In one construction the slave unit operates the adjuster through a ratchet or other one-way clutch or drive ring system.

Some embodiments of our invention are illustrated in the accompanying drawings in which.

Figure 1:
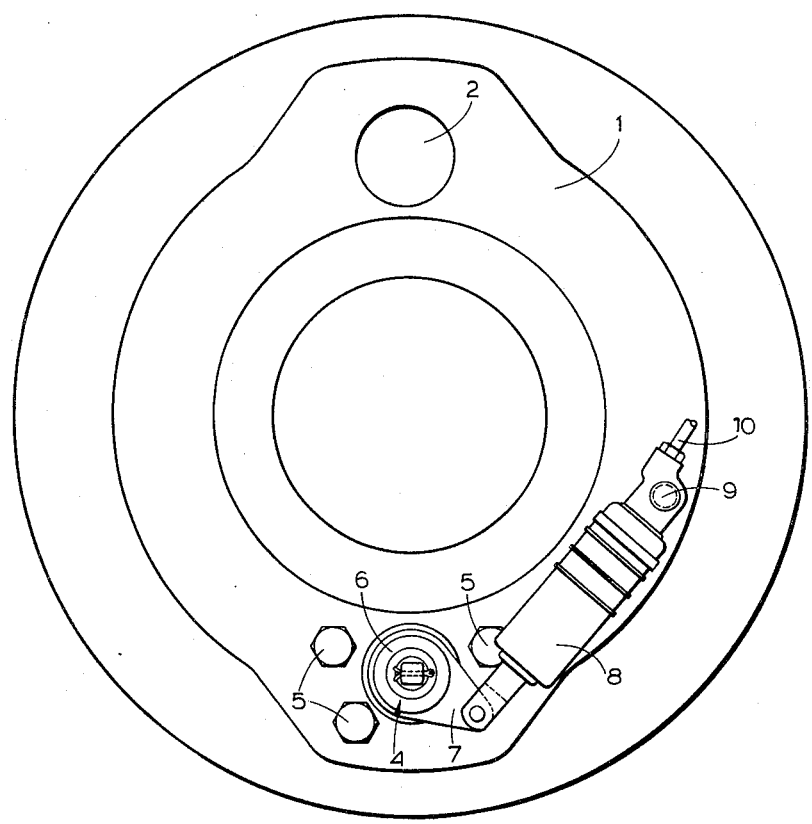
FIG. 1 is a plan of shoe-drum brake.

The shoe-drum brake illustrated in FIG. 1 of the drawings comprises a rigid back plate 1 on the inner face of which are mounted friction members comprising opposed shoes carrying friction linings, for engagement with a rotatable braking member comprising a drum (not shown).

At their actuated ends the shoes are separated by a cam on the inner end of a cam shaft which projects through an opening 2 in the back plate and is rotated by means of a fluid-pressure operated actuator 3. At their opposite ends the shoes fulcrum on abutments in an automatic adjuster 4 which is secured to the back plate by bolts 5. The adjuster is rotated to urge the shoe-ends apart in order to compensate for wear of the linings, by means of a ratchet ring 6 from which a radial arm 7 projects. A slave unit 8 pivotally connected to the back plate 1 by means of a pin 9 is extensible to rotate the arm 7.

Extension of the slave unit 8 to compensate for wear of the friction linings is achieved by the supply of pressure fluid through a pipe-line 10 comprising a bleed passage from the actuator 3.

Figure 2:
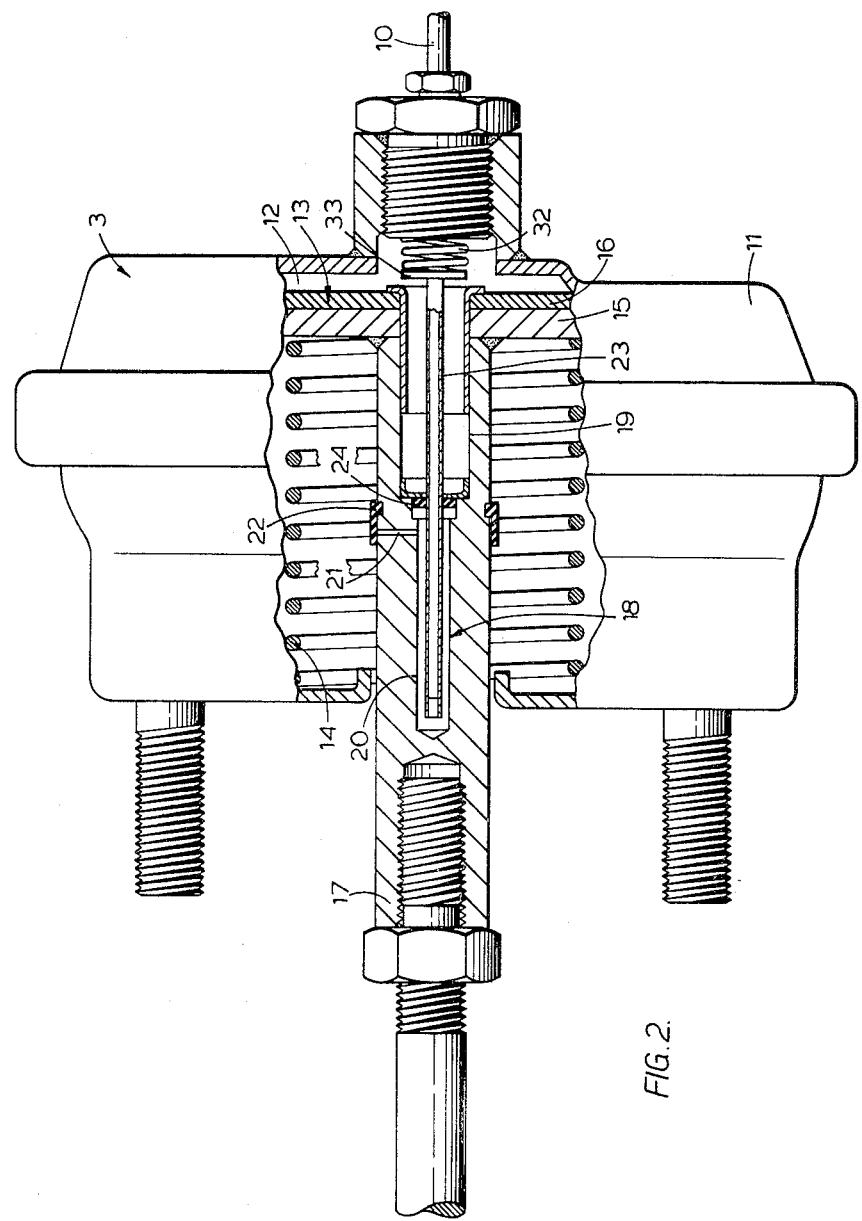
FIG. 2 is a plan including a longitudinal part section through an actuator for the brake of FIG. 1.
Figure 3:
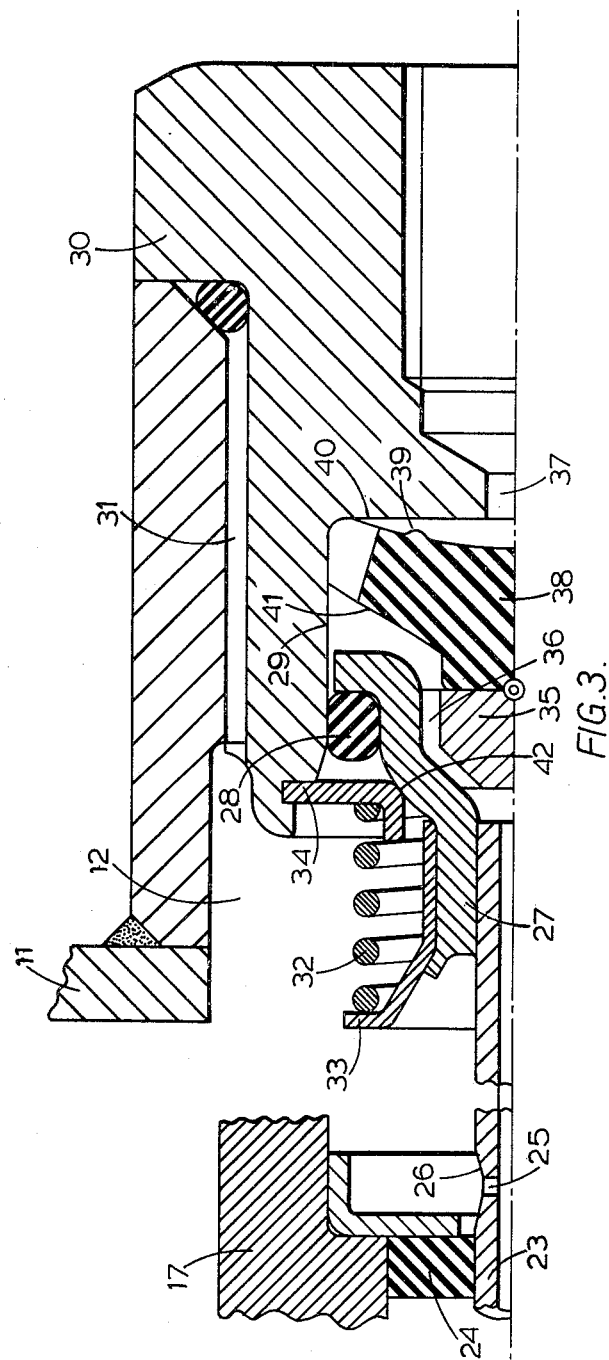
FIG. 3 is a section on an enlarged scale of a portion of the actuator.

As illustrated in FIGS. 2 and 3 of the drawings the actuator 3 is pneumatically operated and comprises a housing 11 which is provided with a power chamber 12 to which air from a brake-applying treadle valve is admitted to advance a movable wall 13 in the housing against the force in a return spring 14. The movable wall 13 comprises a piston 15 which is sealed to the housing 11 by means of a flexible diaphragm 16. The piston 15 carries a piston rod 17 which is axially movable and which acts through a suitable linkage, to cause rotation of the cam shaft.

The piston rod 17 has a longitudinally extending stepped bore 18 of which the portion 19 of greater diameter continues through the piston 13 and into the power chamber 12, and the portion 20 of smaller diameter is in communication with atmosphere through a radial port 21 of which the outer end is closed by a flexible dirt ring 22.

A relatively narrow tube 23 which is closed at its inner end projects through a seal 24 at the step in diameter between the bore portions 19 and 20. Diametral ports 25 in the wall of the tube 23 are normally positioned on the side of the seal 24 which is adjacent to the bore portion 20 so that the interior of the tube 23 is connected to atmosphere. The ports 25 and the seal 24 define first valve means. The ports 25 are located at the base of a recess 26 having inclined flanks to facilitate passage through the seal 24 without damaging it.

A piston 27 rigidly carries the tube 23 at its outer end, and the piston 27 carries a seal 28 which is sealingly guided in a bore 29 in the inner end of a plug 30 which is screwed into a threaded bore 31 at the outer end of the housing 11.

A compression spring 32 acts between an abutment 33 on the piston 27 and an abutment 34 at the inner end of the plug 30 to urge the tube 23 inwardly of the bore.

A plug 35 of plastics material is fixed to the piston 27 and air passages 36 are formed in the plug 35 to connect the interior of the tube 23 to the pipe-line 10 through a passage 37 in the plug 30.

A second valve means is located in the bore 29 between the first valve means and the pipe-line 10. The second valve means comprises a rubber disc 38 having on its outer face an annular bead 39 for sealing engagement with a radial face 40 on the plug 30 between the bore 29 and the passage 37. Normally, the bead 39 is spaced from the face 40 but engages sealingly with it in response to pressure applied to its opposite inner face 41.

In operation the pressure chamber 12 is pressurised by air under the control of the treadle valve which advances the movable wall 13 and the rod 17 to rotate the cam and separate the actuated shoe ends.

The piston 27 is held in engagement with the abutment 34 by the spring 32 and a spherical surface 42 on the piston allows articulation to occur since the piston 27 is held stationary with the seal 24 being withdrawn relative to the tube 23. Articulation is required since the piston rod 17 may move angularly to operate the cam shaft.

The degree of articulation may be minimised by recessing the seal 24 deeply into the rod 17, and the recess may contained a sponge type filler to prevent dirt from entering the ports 25.

In normal operation the ports 25 will remain on the side of the seal 24 adjacent to the bore portion 20, or be covered by the seal 24. Thus, the pipe-line 10 and the slave unit 8 will be maintained at atmospheric pressure.

If, during a brake operation, the movement of the rod 17 is sufficient to cause the ports 25 to move through the seal 24 this may indicate that adjustment is required.

If the pressure in the chamber 12 acting over the piston 27 exceeds the load in the spring 32 before the ports 25 pass through the seal 24, the piston 27 will move towards the plug 30. It deflects the rubber disc 38 in the same direction and the bead 39 seals against the face 40. When and if the ports 25 then pass through the seal 24 pressure from the chamber 12 is then admitted to the tube 23, but this pressure also acts on the face 41 of the disc 38 to maintain the second valve means in the closed position.

When the pressure on opposite sides of the piston 27 equalise the piston 27 is returned to its initial position. The second valve means still remains in the closed position.

If adjustment to compensate for wear of the linings is required, the ports 25 will pass through the seal 24 before the pressure in the chamber 12 is sufficient to displace the piston 27. Pressure is then supplied to the pipe-line 10 to operate the slave unit 8. Under this condition the pressure decrease across the ports 25 and through the passage 36 restricts the air flow sufficiently to make the rubber disc 38 relatively insensitive to air velocity effects, and therefore there is no danger of the second valve means closing when it should remain open.

There may be considerable hysteresis in the disc 38 so that the second valve means opens at a lower pressure than that which is needed to close it. In fact the pressure may even fall to that of atmosphere before the second valve means can open.

The slave unit 8 may include a spring which stores energy in response to pressure from the actuator with such energy being released to rotate the ratchet 6 and increase the effective length of the adjuster 4 through an appropriate increment when the brake is released.

The adjuster can be released, or adjusted manually, by rotation of a squared shaft on the end of the ratchet wheel 6.

Figure 4:
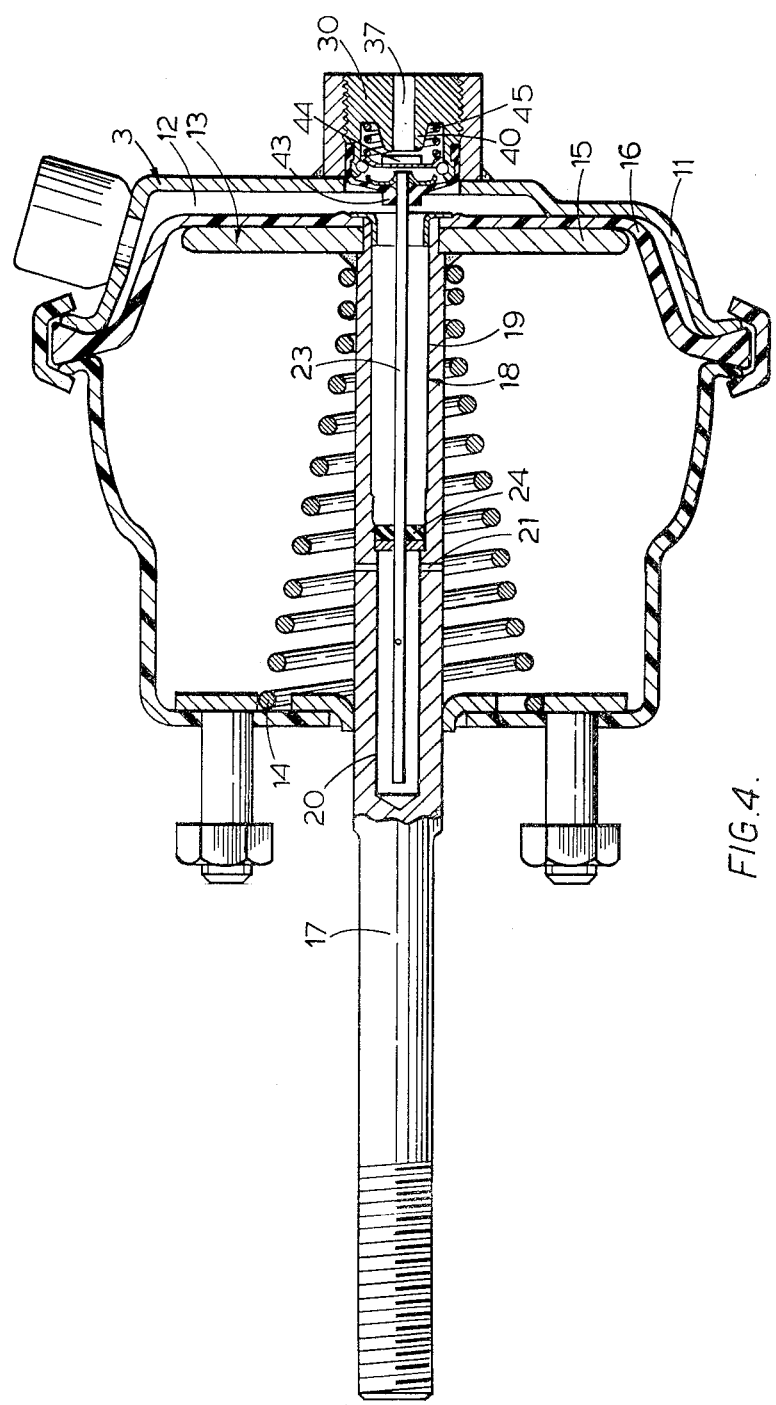
FIG. 4 is a view similar to FIG. 2, but showing a modification.

The actuator shown in FIG. 4 is a modification of that shown in FIG. 2, and corresponding reference numerals have been applied to corresponding parts.

In this construction the second valve means comprises an annular flexible diaphragm 43 which is connected at its inner peripheral edge to the end of the tube 23 which is remote from the piston rod 17 and at its outer peripheral edge to the housing 11. A valve member 44 is adapted to be urged into engagement with the seating 40 surrounding the passage 37 by means of the diaphragm 43, and a compression spring 45 is provided for urging the valve member 44 away from the seating 40.

The construction and operation of this embodiment is otherwise the same as that described in relation to that of FIGS. 2 and 3. The provision of the flexible diaphragm instead of the rubber disc eliminates the sliding friction associated with the latter, which may be considerable.

The provision of the second valve means makes the system load insensitive since the bleed pressure can only be supplied to the slave unit when genuine adjustment is required.

FIGS. 5 to 9 show alternative valve assemblies, for use in conjunction with the actuator of the previous embodiments, in which only one valve means is provided.

Figure 5:
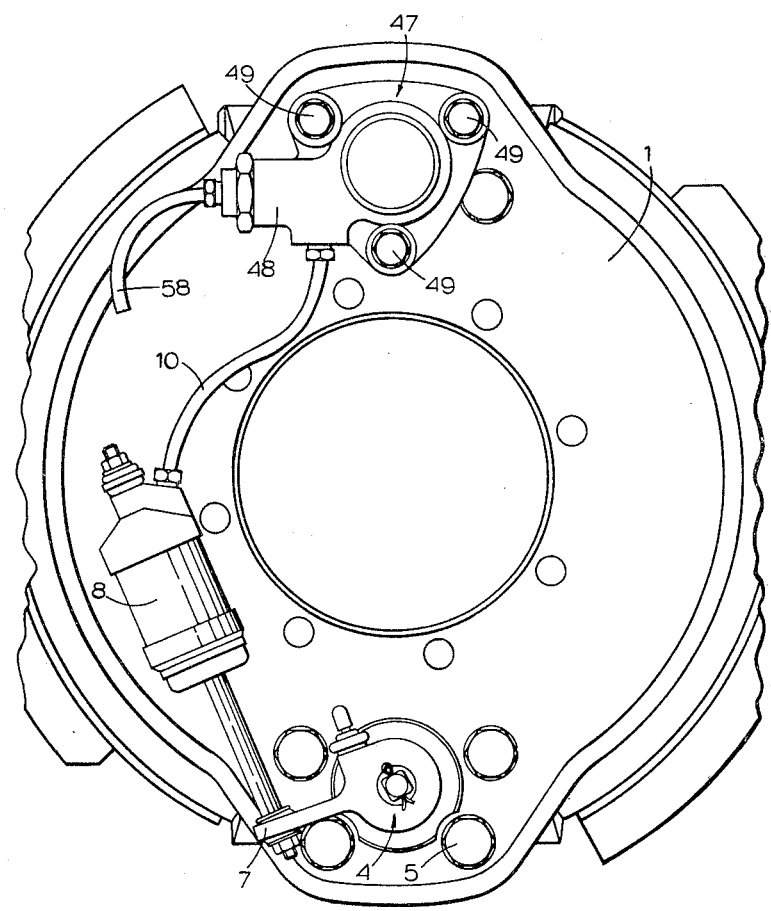
FIG. 5 is a rear view of a further shoe-drum brake including a modified valve assembly.

The shoe-drum brake illustrated in FIG. 5 is similar to that shown in FIG. 1, and corresponding reference numerals have been applied to corresponding parts.

Thus the brake of FIG. 5 comprises a rigid back plate 1 on the inner face of which are mounted opposed shoes carrying friction linings for engagement with a rotatable drum (not shown).

At their actuated ends the shoes are separated by a cam on the inner end of a camshaft 46 which projects through an opening in the back plate and is rotated by means of a fluid-pressure operated actuator (not shown). At their opposite ends the shoes fulcrum on abutments in an automatic adjuster 4 which is secured to the back plate by bolts 5. The adjuster 4 is rotated to urge the shoe-ends apart in order to compensate for wear of the linings, by means of a ratchet ring 6 from which radial arm 7 projects, and slave unit 8 pivotally connected to the back plate 1 by means of a pin is extensible to rotate the arm.

Extension of the slave unit 8 to compensate for wear of the friction linings is achieved by the supply of pressure fluid through a pipe-line 10 comprising a bleed passage from the actuator.

A valve assembly 47 for controlling the supply of pressure fluid to the slave unit 8 is located on the outer end of the camshaft 46.

Figure 6:
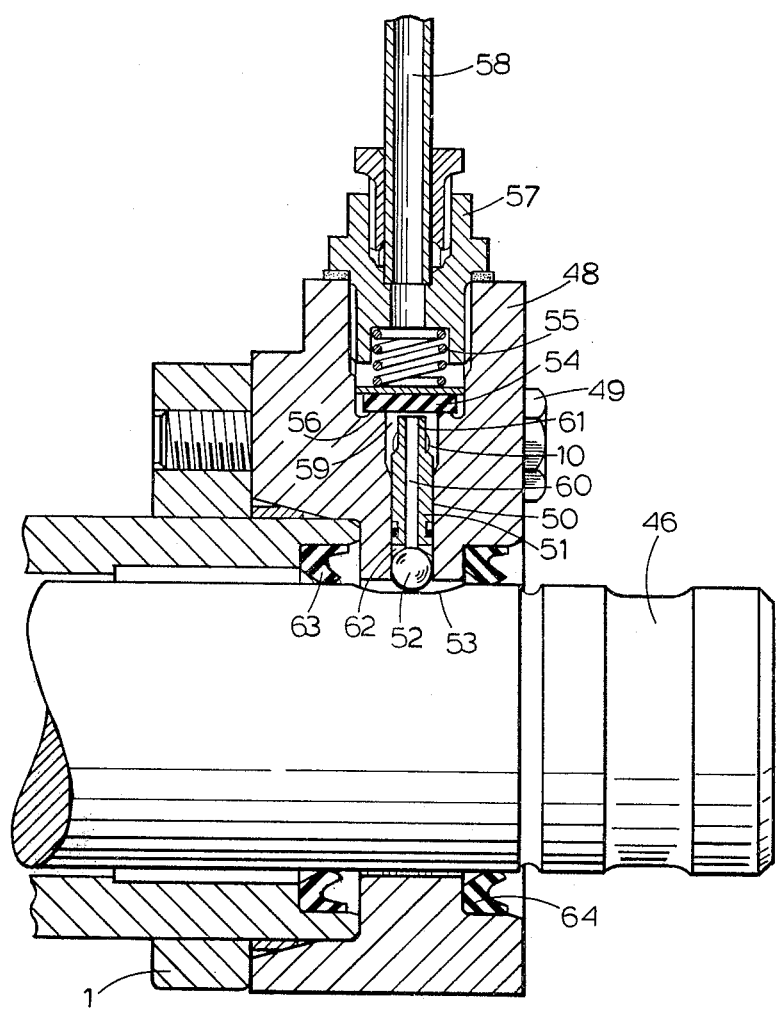
FIG. 6 is a longitudinal section through the valve assembly of FIG. 5.
Figure 7:
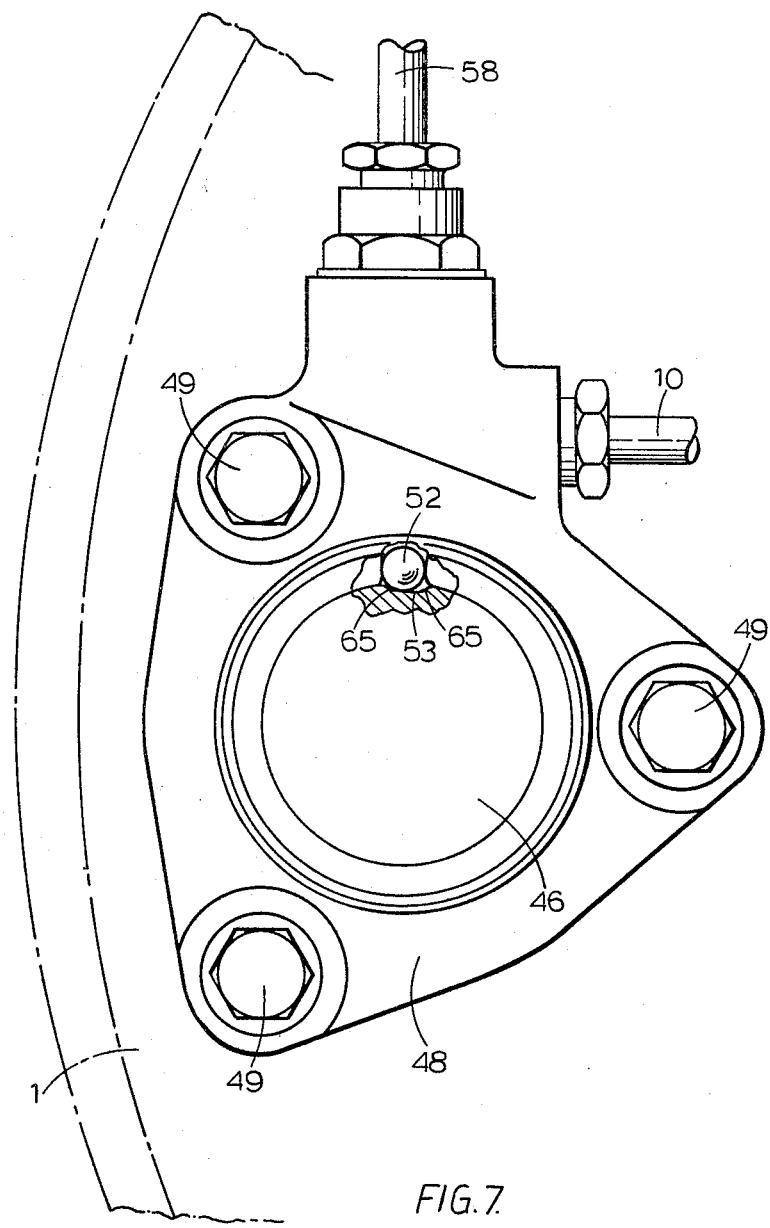
FIG. 7 is an end elevation of the assembly of FIG. 5, including a section through co-operating parts of its mechanism.

As illustrated in FIGS. 6 and 7 the valve assembly comprises a housing 48 through which extends the rotatable cam shaft 46 carrying a cam (not shown) for separating the actuated ends of the pair of brake shoes. The housing 48 is secured by bolts 49 to the back plate 1.

The housing 48 has guide means comprising a stepped radial bore 50 having an inner portion of smallest diameter in which a valve-operating member 51 is guided to slide in a sealing manner. A thrust member 52 in the form of a ball is also guided in the bore and is located between the inner end of the member 51 and the shaft 46, being received within an axially extending notch 53. The opposite outer end of the valve-operating member 51 is normally spaced from a resilient valve member 54 adapted to be urged by a compression spring 55 into engagement with a seating 56 comprising a shoulder at a step in diameter in the bore 50. The outer end of the spring 55 abuts against a face in a union 57 which is screwed into the outer portion of the bore 50 which is of greatest diameter. The union 57 provides a connection for a pipe-line 58 which leads from the pressure side of the housing of the actuator. The pipe-line 10 to the slave unit 8 of the adjuster 4 is connected into a chamber 59 in the housing 48 which is defined by a portion of the bore 50 located between the valve member 54 and the valve-operating member 51. The valve-operating member 51 is provided with an exhaust port 60 comprising a bore of which the outer end 61 is in communication with the chamber 59 and the inner end 62 is in communication with the inner end of the bore 50 which in turn can communicate to atmosphere due to the arrangement of the seals 63, 64 between the cam shaft 46 and the housing 48.

Normally the valve assembly 47 is in the closed position shown, and the valve member 54 is urged into engagement with the seating 56 to isolate the pipe-line 58 from the pipe-line 10.

The circumferential length of the notch 53 is chosen such that during normal rotation of the camshaft 46 to operate the brake, the valve assembly 47 will remain in the closed position shown. However, should adjustment to compensate for wear be required, indicated by excessive rotation of the camshaft 46, a face 65 at a corresponding end of the notch 53 will engage with the ball 52 to cause it to move outwardly, in turn urging the valve-operating member 51 in a direction to contact the valve member so as to close the exhaust port 60 and to urge the valve member 54 away from the seating. The pipe-line 58 is then placed in communication with the pipe-line 10 so that pressure fluid is supplied to the slave unit 8 to carry out the adjustment sequence as described in relation to the previous embodiments. When the brake is released, rotation of the camshaft 46 in the opposite direction will move the valve-operating member 51 out of contact with the valve member 54. The valve will, therefore, close, and the exhaust port 60 will open to allow pressurised fluid to exhaust from the slave unit 8.

Figure 8:
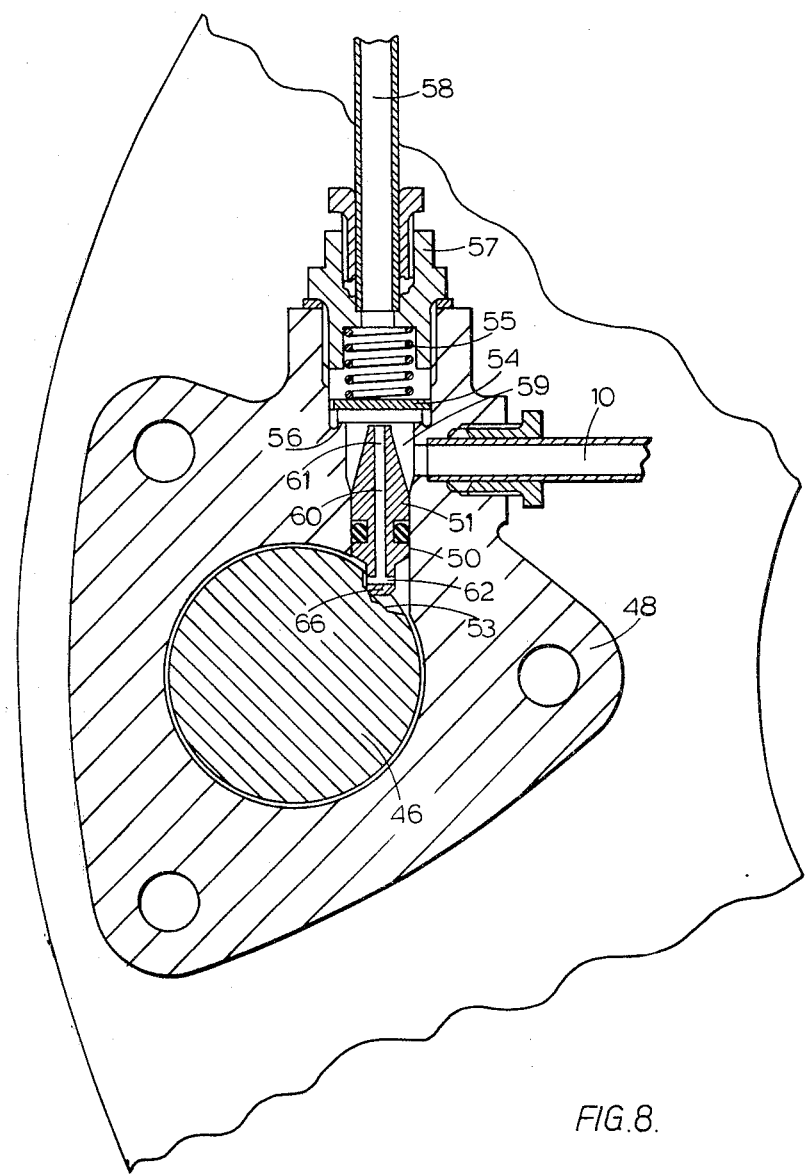
FIG. 8 is a transverse section through a modified valve assembly.

In a modification shown in FIG. 8 the thrust member 52 is omitted, with the inner end 66 of the valve-operating member being so shaped as to co-operate with the camshaft 46. The rest of the construction and operation for this embodiment is the same as that described for FIGS. 5 to 7, and corresponding reference numerals have been applied to corresponding parts.

The valve means shown in FIGS. 5 to 8 has a disadvantage in that the valve member 54 is resilient, so that a relatively large amount of travel of the valve-operating member 51 is required to open the valve completely. Thus when only a slight amount of adjustment of the brake clearances is required, the valve may not open completely. If the valve is only partially open, the pressure fluid can seep through, but it takes an appreciable length of time for the slave unit 8 to build up sufficient pressure to operate the adjuster 4. This means that the brake clearances may not be consistent if slight adjustment only is required.

Figure 9:
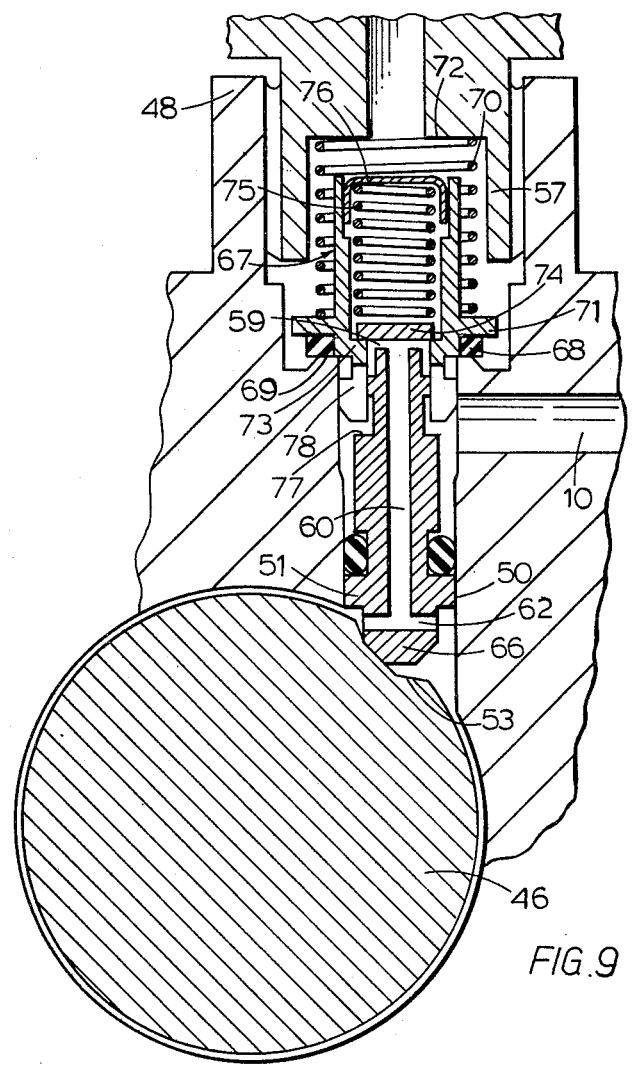
FIG. 9 is similar to FIG. 8, but shows further modifications of the valve assembly.

The embodiment of FIG. 9 shows a modified valve assembly which overcomes this disadvantage. This valve assembly is similar to that shown in FIG. 8, and corresponding reference numerals have been applied to corresponding parts.

The valve assembly comprises a housing 48 provided with a stepped radial bore 50 in which the valve is located. A valve-operating member 51 is slidably guided in a sealing manner in the inner end of the bore 50 of smaller diameter and co-operates at its outer end 66 with the valve, and at its inner end with the camshaft 46 provided with the notch 53. The valve-operating member 51 is also provided with an exhaust port 60.

The valve member comprises a valve sleeve 67 provided with an annular rubber seal 68, round the outside of the sleeve 67, which seals against a seating comprising a shoulder 69 in the housing 48 at a step in the bore 50. The seal 68 is normally held in a closed position by a first spring 70 working between an external shoulder 71 on the sleeve and a face 72 in a union 57 which is screwed into the outer end of the bore 50. The union 57 provides a connection for a pipe-line (not shown) which leads from the pressure side of the actuator housing. The pipe-line 10 to the slave unit 8 of the adjuster 4 is connected to the chamber 59 in the bore 50. The valve sleeve 67 is also provided with an internal shoulder 73, against the outer side of which a metal disc 74 is biassed by a second spring 75 acting between the disc 74 and a closed end 76 of the sleeve 67. The valve-operating member 51 is able to contact the disc 74, and is also provided with a shoulder 77 which is able to contact a nose 78 on the inner end of the valve sleeve 67.

Normally the valve is in the closed position shown so that the pipe-line from the actuator is isolated from the pipe-line 10.

As in FIGS. 6 to 8, the length of the notch 53 is chosen such that during normal rotation of the shaft 46 in operating the brake, the valve assembly remains closed. The fact that adjustment is required is indicated by excessive rotation of the shaft 46, which urges the valve-operating member 51 outwardly. The valve-operating member 51 contacts the metal disc 74, thereby closing the exhaust port 60, and lifting the disc 74 off the shoulder 73. The strength of the second spring 75 is chosen so that the force it exerts is greater than the force of the first spring 70 and the air pressure combined, so that the valve sleeve 67 is lifted off its seat 69. Pressure fluid is therefore admitted to the slave unit 8, and the adjustment sequence is carried out, as described previously.

On release of the brake, the valve-operating member 51 moves inwardly again, and out of contact with the disc 74, so that the valve closes again, and the exhaust port 69 is opened. In order to avoid pressure fluid being trapped in chamber 59 on the outer side of the disc 74, the disc may be notched, or otherwise shaped to provide a leak path between the disc and the internal shoulder 73.

With this valve assembly, the valve snaps open due to the strength of the second spring 75 as soon as the valve-operating member 51 moves the disc 74 off the shoulder 73, and so the valve cannot be partly open.

Alternatively, the strength of the second spring 75 could be reduced, so that outward movement of the disc 74 may not be sufficient to open the valve. In this case the valve-operating member 51 continues to move outwards until the shoulder 77 contacts the nose 78 of the valve sleeve 67. The second spring 75 then acts to assist the valve-operating member 51 in pushing the sleeve outwards, so that the valve then snaps open.

Our invention is also applicable to actuators operated by hydraulic pressure, and to all types of vehicle brakes where the actuator is remote from the adjuster.

We claim:

1. A brake for a vehicle comprising a rotatable braking member, a friction member for engagement with said rotatable braking member, a fluid pressure operated acutator, comprising a housing and relatively movable parts located in said housing, said actuator being adapted to urge said friction member into engagement with said braking member, an automatic adjuster for automatically maintaining predetermined brake clearances, a supply of pressure fluid for operating said adjuster, and a valve assembly for controlling supply of said pressure fluid to operate said adjuster, said valve assembly being operable to supply said pressure fluid to operate said adjuster when relative movement between the said parts of said actuator exceeds a predetermined value, and said valve assembly comprises a first valve means and a second valve means disposed between said first valve means and said adjuster, said first valve means being normally closed and said second valve means being normally open, and when said actuator is operated and adjustment of said brake clearances is not required, said second valve means is adapted to close in response to fluid pressure generated by said actuator before said first valve means opens, and when adjustment is required, said first valve means opens before said second valve means can close to supply said fluid to operate said adjuster.

2. A brake for a vehicle comprising a rotatable braking member, a friction member for engagement with said rotatable braking member, a fluid-pressure operated actuator, comprising a housing and relatively movable parts located in said housing, said actuator being adapted to urge said friction member into engagement with said braking member, an automatic adjuster for automatically maintaining predetermined brake clearances, a supply of pressure fluid for operating said adjuster, and a valve assembly for controlling supply of said pressure fluid to operate said adjuster, said valve assembly being operable to supply said pressure fluid to operate said adjuster when relative movement between the said parts of said actuator exceeds a predetermined value, said valve assembly incorporating a single valve means, and said valve means being operable in response to rotation of a shaft for applying said brake.

3. A brake as claimed in claim 1 or claim 2, wherein said supply of pressure fluid comprises a bleed of pressure fluid from said actuator.

4. A brake as claimed in claim 1 or claim 2, wherein said supply of pressure fluid is separate from said actuator.

5. A brake as claimed in claim 1 or claim 2 incorporating a slave unit for operating said adjuster, said slave unit being adapted to produce a motive force in response to said pressure fluid from said supply.

6. A brake as claimed in claim 5, wherein said first valve means is incorporated in said housing of said actuator, and said supply of pressure fluid comprises a bleed from said actuator, and said second valve means is closed when said actuator pressure rises above a chosen threshold level, and is opened when it falls below said level.

7. A brake for a vehicle comprising a rotatable braking member, a friction member for engagement with said rotatable braking member, a fluid-pressure operated actuator, comprising a housing and relatively movable parts located in said housing, said actuator being adapted to urge said friction member into engagement with said braking member, an automatic adjuster for automatically maintaining predetermined brake clearances, a slave unit for operating said adjuster, a supply of pressure fluid adapted to be supplied to said slave unit for operation of said adjuster, said slave unit producing a motive force in response to said pressure fluid from said supply, said supply comprising a bleed from said actuator, and a valve assembly for controlling supply of said pressure fluid, said valve assembly being operable to supply said pressure fluid to said slave unit for operation of said adjuster when relative movement between said parts of said actuator exceeds a predetermined value, said valve assembly comprising a first valve means incorporated into said actuator housing and a second valve means incorporated into said actuator housing and disposed between said first valve means and said slave unit, said first valve means being normally closed and comprising a tube having ports, said tube being adapted to slide through a seal in response to relative movement between said parts of said actuator, and being arranged to open when said relative movement exceeds said predetermined value, so that when said first valve means is open said pressure fluid is supplied to said tube, and said second valve means being normally open and located between said housing and an end of said tube, and being adapted to close to cut-off communication between said tube and a pipe-line to said slave unit for said pressure fluid in response to fluid pressure generated by said actuator when said actuator pressure rises above a chosen threshold level, said second valve means being adapted to close before said first valve means opens when adjustment of said brake clearances is not required, and when adjustment is required said first valve means opens before said second valve means can close in order to supply pressure fluid to said slave unit.

8. A brake as claimed in claim 7, wherein said second valve means includes a resilient rubber disc, said disc being adapted to engage with a seating surrounding said pipe-line.

9. A brake as claimed in claim 7, wherein said second valve means comprises a flexible annular diaphragm connected between said housing and said end of said tube, a valve member urged by said diaphragm into engagement with a seating surrounding said pipe-line, and a spring urging said valve member away from said seating.

10. A brake for a vehicle comprising a rotatable braking member, a friction member for engagement with said rotatable braking member, a fluid-pressure operated actuator, comprising a housing and relatively movable parts located in said housing, said actuator being adapted to urge said friction member into engagement with said braking member, an automatic adjuster for automatically maintaining predetermined brake clearances, a slave unit for operating said adjuster, and a supply of pressure fluid adapted to be supplied to said slave unit for operation of said adjuster, said slave unit producing a motive force in response to said pressure fluid from said supply, and a valve assembly for controlling supply of said pressure fluid to said slave unit for operation of said adjuster, said valve assembly being operable to supply said pressure fluid to said slave unit for operation of said adjuster when relative movement between the said parts of said actuator exceeds a predetermined value, said valve assembly incorporating a single valve means, said valve means being operable in response to rotation of a camshaft for applying said brake, said camshaft being provided with an axially extending notch, said notch receiving a member for operating said valve means, said valve-operating member having outer and inner ends, and being held against rotation, but permitted to move in a radial direction by guide means.

11. A brake as claimed in claim 10, wherein said valve assembly comprises a housing having said guide means in the form of a bore radial to said camshaft, said bore having inner and outer portions, said valve means comprising a valve member located in said outer portion of said bore, said valve member being normally biassed to closure against a seating to cut off communication between said supply of pressure fluid and a pipe-line to said slave unit, and said valve-operating member being guided in said inner portion of said bore, and being provided with an exhaust port for said pressure fluid from said slave unit, said exhaust port being closed when said valve means is open, said valve-operating member at said inner end co-operating with said camshaft, and at said outer end being adapted to operate said valve member.

12. A brake as claimed in claim 11, wherein said valve member comprises a resilient disc.

13. A brake as claimed in claim 11, wherein said valve member comprises a valve sleeve.

14. A brake as claimed in claim 10, wherein said valve-operating member co-operates directly with said camshaft.

15. A brake as claimed in claim 10, wherein a thrust member is interposed between said valve-operating member and said camshaft.

16. A brake as claimed in claim 5, wherein said slave unit is of the reciprocating type embodying pistons and diaphragms.

17. A brake as claimed in claim 5, wherein said slave unit operates said adjuster through a ratchet.

18. A brake as claimed in claim 1 or claim 2, wherein said brake is of the internal shoe-drum type.

19. A brake as claimed in claim 1 or claim 2, wherein said actuator is operated by pneumatic pressure.

20. A brake as claimed in claim 1 or claim 2, wherein said actuator is operated by hydraulic pressure.

* * * * *